United States Patent
Lee (10) Patent No.: US 11,308,732 B2
(45) Date of Patent: Apr. 19, 2022

(54) FACE RECOGNITION METHOD AND APPARATUS

(71) Applicant: Wistron Corporation, New Taipei (TW)

(72) Inventor: Chin-Lung Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 120 days.

(21) Appl. No.: 16/724,408

(22) Filed: Dec. 23, 2019

(65) Prior Publication Data

US 2021/0124912 A1    Apr. 29, 2021

(30) Foreign Application Priority Data

Oct. 25, 2019   (TW) .................................. 108138720

(51) Int. Cl.
*G06V 40/16*   (2022.01)
*G06F 16/583*  (2019.01)
*G06T 7/246*   (2017.01)
*G10L 17/00*   (2013.01)

(52) U.S. Cl.
CPC .......... *G06V 40/173* (2022.01); *G06F 16/583* (2019.01); *G06T 7/246* (2017.01); *G06V 40/169* (2022.01); *G10L 17/00* (2013.01); *G06T 2207/30201* (2013.01)

(58) Field of Classification Search
CPC ........... G06T 2207/30201; G06T 7/246; G10L 17/00; G06K 9/00275; G06K 9/00295; G06F 16/583
See application file for complete search history.

(56) References Cited

U.S. PATENT DOCUMENTS

| 9,633,270 | B1 * | 4/2017 | Tangeland ............ G10L 17/00 |
| 2011/0285807 | A1 | 11/2011 | Feng |
| 2016/0344928 | A1 * | 11/2016 | Qu ...................... H04N 5/23219 |
| 2017/0295318 | A1 * | 10/2017 | MacMillan ............ G03B 37/04 |

(Continued)

FOREIGN PATENT DOCUMENTS

| CN | 105701466 | 6/2016 |
| CN | 109459722 | 3/2019 |

OTHER PUBLICATIONS

"Office Action of Taiwan Counterpart Application", dated Jun. 30, 2020, p. 1-p. 13.

*Primary Examiner* — Mia M Thomas
(74) *Attorney, Agent, or Firm* — JCIPRNET (57) ABSTRACT

A face recognition method and apparatus are provided. The method is applicable to an electronic device including a sound receiving device and an image capturing device, and includes the following steps: detecting a direction of a sound source by using the sound receiving device, to capture an image in the direction by using the image capturing device; detecting and tracking a face in the image, to assign an image identification to the face according to a tracking result; determining whether the image identification exists in multiple cluster identifications recognized in a data set of face recognition; and in response to the image identification not existing in the data set, acquiring a feature value of the face and comparing the feature value of the face with a feature value of a face of each cluster identification to update a cluster identification to which the face belongs according to a comparison result.

18 Claims, 5 Drawing Sheets

(56) References Cited

U.S. PATENT DOCUMENTS

| | | | |
|---|---|---|---|
| 2017/0337438 A1* | 11/2017 | El Kaliouby, Jr | G16H 50/20 |
| 2018/0020285 A1* | 1/2018 | Zass | G06K 9/00369 |
| 2018/0061006 A1* | 3/2018 | Lei | G06T 3/0012 |
| 2019/0156559 A1* | 5/2019 | Holzer | G06F 3/04842 |
| 2019/0370992 A1* | 12/2019 | Takami | H04N 21/44008 |
| 2020/0034981 A1* | 1/2020 | Torama | G06K 9/00228 |
| 2020/0066294 A1* | 2/2020 | Zass | H04R 1/406 |
| 2020/0219135 A1* | 7/2020 | Hahn | G06K 9/00771 |
| 2020/0358982 A1* | 11/2020 | Tsui | G06K 9/00228 |
| 2021/0168241 A1* | 6/2021 | Wang | G06T 7/70 |
| 2021/0224522 A1* | 7/2021 | Park | H04N 5/23238 |
| 2021/0374994 A1* | 12/2021 | Lu | G06F 3/012 |

\* cited by examiner

FACE RECOGNITION METHOD AND APPARATUS

CROSS-REFERENCE TO RELATED APPLICATION

This application claims the priority benefit of Taiwan application serial no. 108138720, filed on Oct. 25, 2019. The entirety of the above-mentioned patent application is hereby incorporated by reference herein and made a part of this specification.

BACKGROUND OF THE INVENTION

1. Field of the Invention

The invention relates to a recognition method and apparatus, and in particular, to a face recognition method and apparatus.

2. Description of Related Art

In recent year, face recognition technologies grow explosively, and the technologies are more mature, major manufacturers, regardless of computer manufacturers or mobile phone manufacturers, are flocking to launch production products and mount technical application of relevant face technologies. However, the technical application of most face technologies may apply actual real computing and feature recognition technologies to cloud services due to the following reasons: 1. to seek higher accuracy; 2. a core technology of a confidential face database; 3. most apparatuses cannot afford such a large amount of computing; and 4. to respond more rapidly, and so on. There are various reasons for this, which are not described in detail.

However, a mobile apparatus or device using the foregoing method needs to have a networking function; otherwise, the function cannot be used. In addition, use of cloud services also has a data security risk of data stolen by a third party, or a problem that face information is used for other unanticipated services.

SUMMARY OF THE INVENTION

The invention provides a face recognition method and apparatus, which can increase a fault tolerance rate of face recognition by continuously tracking an object that is speaking and that is determined as a face.

The face recognition method in an embodiment of the invention is applicable to an electronic device including a sound receiving device and an image capturing device. The method includes the following steps: detecting a direction of a sound source by using the sound receiving device, to capture an image in the direction by using the image capturing device; detecting and tracking a face in the image, to assign an image identification to the face according to a tracking result; determining whether the image identification exists in a plurality of cluster identifications already recognized in a data set of face recognition; and in response to the image identification not existing in the data set, acquiring a feature value of the face, and comparing the feature value of the face with a feature value of a face of each cluster identification, to update a cluster identification to which the face belongs according to a comparison result.

The face recognition apparatus in an embodiment of the invention includes a sound receiving device configured to detect a sound source, an image capturing device configured to capture an image, and a processor. The processor is coupled to the sound receiving device and the image capturing device, and configured to: detect a direction of a sound source by using the sound receiving device, to capture an image in the direction by using the image capturing device; detect and track a face in the image, to assign an image identification to the face according to a tracking result; determine whether the image identification exists in a plurality of cluster identifications already recognized in a data set of face recognition; and in response to the image identification not existing in the data set, acquire a feature value of the face, and compare the feature value of the face with a feature value of a face of each cluster identification, to update a cluster identification to which the face belongs according to a comparison result.

DESCRIPTION OF THE EMBODIMENTS

The embodiments of the invention are directed to a controllable or a highly limited place, such as a conference room or a classroom, where a microphone array is used for positioning a direction, and an image in a direction of a sound source is captured to recognize a face, so as to improve face recognition efficiency. An object tracking algorithm is further used in the embodiments of the invention to track a face, and overlapping faces and a face having left the image are/is unregistered/re-registered, to increase a fault tolerance rate.

Figure 1:
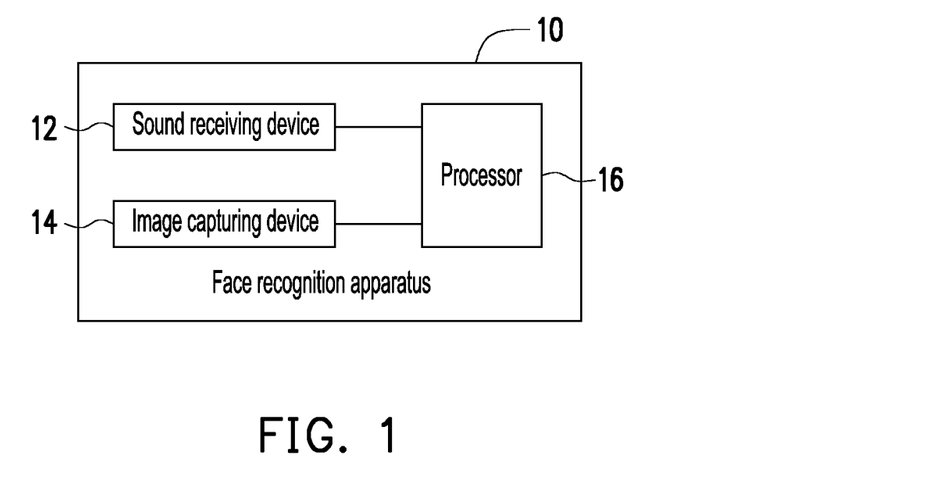
FIG. 1 is a schematic block diagram of a face recognition apparatus according to an embodiment of the invention.

FIG. 1 is a schematic block diagram of a face recognition apparatus according to an embodiment of the invention. Referring to FIG. 1, the face recognition apparatus 10 in the present embodiment is, for example, a video conference device, a distance learning device, or a computing device with a video conference function or other communication functions such as a computer, a server or a work station, or a portable device such as a mobile phone or a tablet computer. This is not limited herein. The face recognition apparatus 10 includes a sound receiving device 12, an image capturing device 14, and a processor 16, and their functions are respectively described as follows:

The sound receiving device 12 is, for example, a device that can recognize a direction of a sound source, such as a microphone, a directional microphone, or a microphone array, where the number and positions of microphones may be freely configured as required, and are not limited herein. The sound receiving device 12 includes, for example, a servo motor, which may drive the microphone according to the recognized direction of the sound source, to change a position and/or an angle of the microphone, so as to turn to the direction of the sound source to receive sound.

The image capturing device 14 includes, for example, components such as a lens, an aperture, a shutter, and an image sensor. The lens includes a plurality of optical lenses, which are, for example, driven by an actuator drive such as a step motor or a voice coil motor, to change relative positions between the lenses, thereby changing a focal length of the lens. The image sensor includes, for example, a charge coupled device (CCD), a complementary metal-oxide semiconductor (CMOS) device, or other types of light sensitive devices, and is configured behind the lens, to sense intensity of light incident to the lens to generate an image of a photographed object. In an embodiment, the image capturing device 14 is, for example, a 360-degree panoramic camera, which includes, for example, two wide-angle cameras with a viewing angle of 180 degrees and can capture a 360-degree panoramic image around the face recognition apparatus 10.

The processor 16 is, for example, a central processing unit (CPU), or other programmable microprocessors, a digital signal processors (DSP), a programmable controller, an application-specific integrated circuit (ASIC), or other similar components, or a combination thereof. In the present embodiment, the processor 16 is coupled to the sound receiving device 12 and the image capturing device 14, and is configured to access and execute a computer program, to implement a face recognition method in the embodiments of the invention.

In an embodiment, the face recognition apparatus 10 further includes a communications apparatus. The communications apparatus supports, for example, a Global System for Mobile Communications (GSM), a personal handy-phone system (PHS), a Code Division Multiple Access (CDMA) system, Worldwide Interoperability for Microwave Access (WiMAX), wireless fidelity (Wi-Fi), a wireless communications technology such as WiMAX or Bluetooth, so that the face recognition apparatus 10 can establish a wireless connection to an external apparatus, and perform a communication function such as a video call, a video conference, or distance learning. This is not limited herein.

In an embodiment, alternatively, the sound receiving device 12 and the image capturing device 14 may be configured independent of the face recognition apparatus 10, and the processor 16 receives, in a wired or wireless manner by using a connection interface such as a universal serial bus (USB) or the foregoing communications apparatus, a sound signal output by the sound receiving device 12 and an image output by the image capturing device 14. This is not limited herein.

Figure 2:
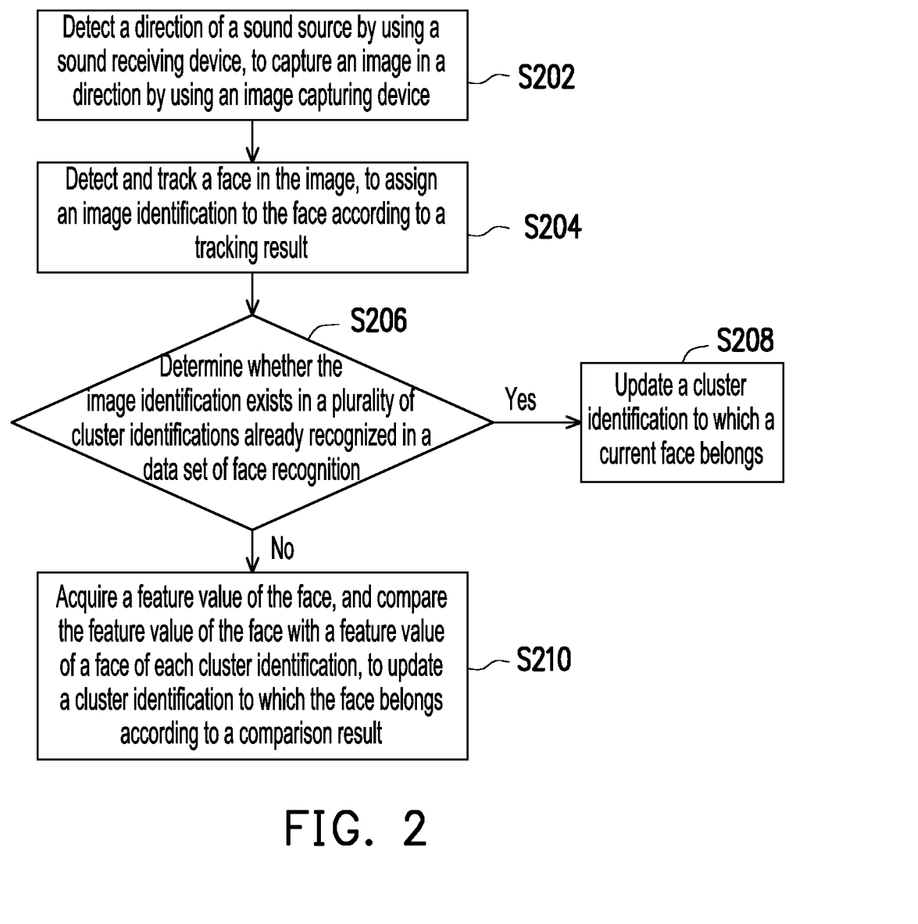
FIG. 2 is a schematic flowchart of a face recognition method according to an embodiment of the invention.

FIG. 2 is a schematic flowchart of a face recognition method according to an embodiment of the invention. Referring to both FIG. 1 and FIG. 2, the method in the present embodiment is applicable to the foregoing face recognition apparatus 10. The following describes a detailed process of the method in the present embodiment in combination with the components of the face recognition apparatus 10 in FIG. 1.

First, in step S202, the processor 16 detects a direction of a sound source by using the sound receiving device 12, to capture an image in the direction by using the image capturing device 14. In an embodiment, before detecting the sound source by using the sound receiving device 12, the processor 16, for example, initializes the sound receiving device 12, including: capturing a panoramic image around the face recognition apparatus 10 by using the image capturing device 14, and recognizing a face in the panoramic image, to adjust a detection angle of the sound receiving device 12 to pointing to a direction of the recognized face.

Figure 3:
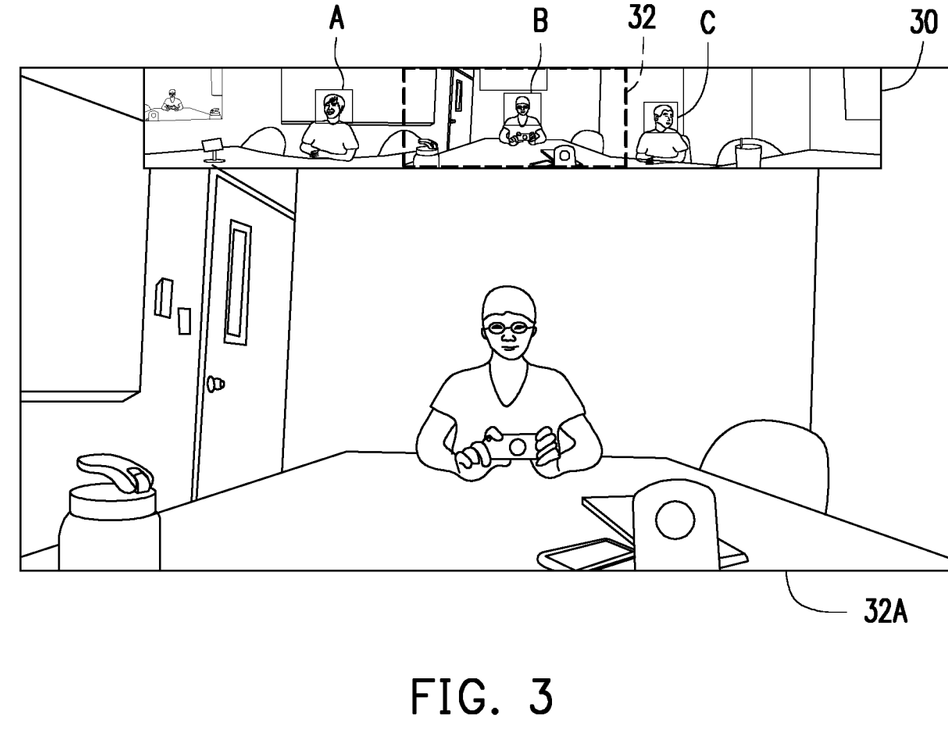
FIG. 3 is a schematic example of capturing an image in a direction of a sound source according to an embodiment of the invention.

For example, FIG. 3 is a schematic example of capturing an image in a direction of a sound source according to an embodiment of the invention. Referring to FIG. 3, in the present embodiment, it is assumed that the face recognition apparatus 10 is placed on a table of a conference room, to be provided for a plurality of users A, B, and C in the conference room to have a video conference. In an embodiment, the face recognition apparatus 10 captures a panoramic image 30 around it by using the image capturing device 14, and detects a direction of a sound source (for example, the user B that is speaking) by using the sound receiving device 12, to crop an image of a partial region 32 in the detection direction in the panoramic image 30 according to the direction of the sound source, as an image 32A on which face recognition is to be performed. In an embodiment, alternatively, the face recognition apparatus 10 may first perform face recognition on the panoramic image 30 captured by the image capturing device 14, so as to adjust a detection angle of the sound receiving device 12 to pointing to a direction of the recognized face, thereby improving efficiency and accuracy of sound source detection.

It should be noted that, in an embodiment, the processor 16 further determines whether the sound source is voice by using at least one feature of the sound source that is detected by the sound receiving device 12. The feature includes a sounding time interval, a continuous sounding length, convergence of sounding data, and the like. To be specific, the processor 16, for example, determines whether a sound signal detected by the sound receiving device 12 is empty, to determine whether someone is speaking; determines a sounding time interval in the sound signal detected by the sound receiving device 12, to determine whether a same person speaks (if the time interval is too long, it indicates that different persons speak); determines a continuous sounding length in the sound signal detected by the sound receiving device 12, to determine whether a valid speech is made (and if the speech is too short, it indicates that the detected sound may be a cough or other sound, instead of a speech); and determines convergence of sounding data in the sound signal detected by the sound receiving device 12, to determine whether the sound receiving device 12 has been turned to the direction of the sound source. For example, if an original sound receiving direction of the sound receiving device 12 is 0 degrees, and the direction of the sound source is 180 degrees, the sound receiving direction of the sound receiving device 12, gradually converges towards 180 degrees in a direction of 0 degrees, 90 degrees, 130 degrees, 175 degrees, or 180 degrees. Whether the convergence is completed may be determined according to data convergence of the sound signal.

Returning to the process of FIG. 2, in step S204, the processor 16 detects and tracks a face in the image, to assign an image identification to the face according to a tracking result. To be specific, when detecting that the image includes a face, the processor 16, for example, performs an object tracking algorithm, to track each face in the image, and assign an image identification to the tracked face according to the tracking result.

Figure 4:
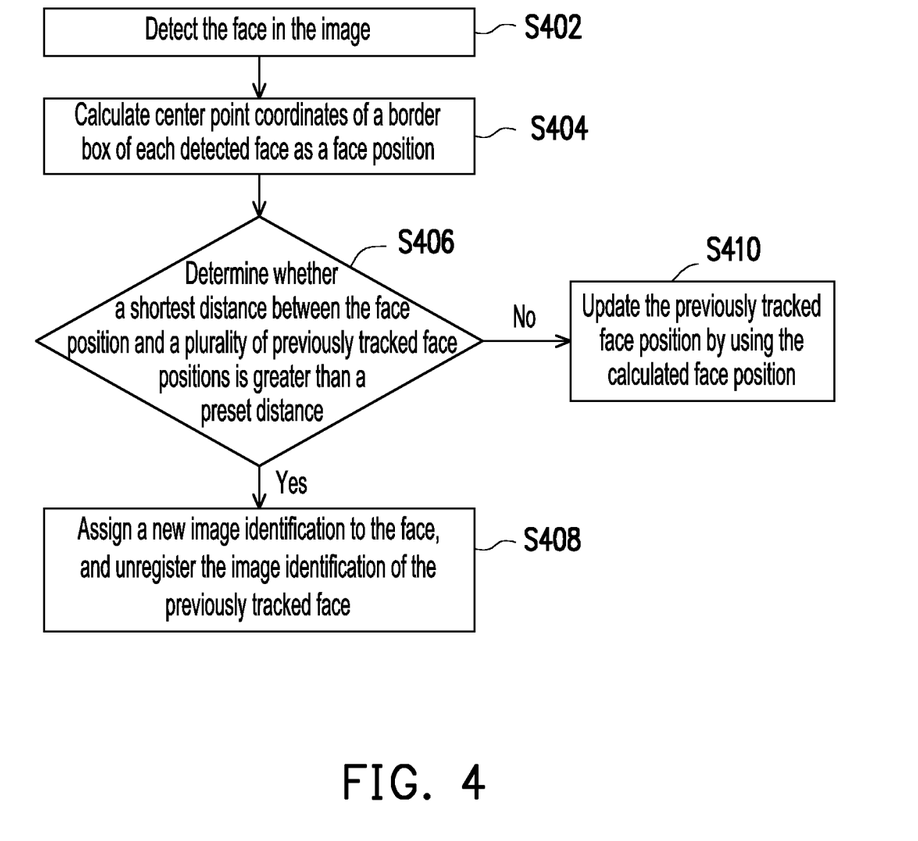
FIG. 4 is a schematic flowchart of an object tracking method according to an embodiment of the invention.

FIG. 4 is a schematic flowchart of an object tracking method according to an embodiment of the invention. Referring to FIG. 4, a detailed process of step S204 in FIG. 2 is described in the present embodiment.

In step S402, the processor 16 detects the face in the image. In an embodiment, the processor 16, for example, calculates a minimum rectangle that can cover an outline of the face as a border box of the face to define a face region.

Figure 5:
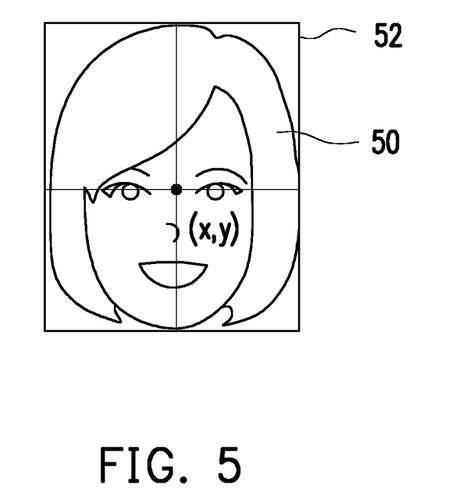
FIG. 5 is a schematic example of a center point tracking method according to an embodiment of the invention.

In step S404, the processor 16 calculates center point coordinates of a border box of each detected face as a face position. To be specific, the processor 16, for example, performs a center point tracking method (CentroidTracker), to track the face by using the center point coordinates of the border box of the face as the face position. Using FIG. 5 as an example, for a detected face 50, the processor 16 calculates a minimum rectangle that can cover an outline of the face as a border box 52, and then calculates center point coordinates (x, y) of the border box 52, to be used as a position of the face 50.

In step S406, the processor 16 determines whether a shortest distance between the position of the currently detected face and a plurality of previously tracked face positions is greater than a preset distance. To be specific, a face position in the plurality of previously tracked face positions that has a shortest distance to the position of the currently detected face may be assumed as a possible previous position of the currently detected face, and it may be determined, according to a distance between the two face positions, whether the face position is a previous position of the currently detected face. The distance between the face positions is, for example, an European distance, but is not limited thereto.

In response to the shortest distance being greater than the preset distance, it indicates that the distance between the two face positions is too long, the two faces do not represent a same person, and the previously tracked face has disappeared from the currently captured image. In this case, step S408 is performed, and the processor 16 assigns a new image identification to the currently detected face, and unregisters the image identification of the previously tracked face, to perform subsequent re-recognition. On the contrary, in response to the shortest distance being not greater than the preset distance, it indicates that faces corresponding to the two face positions belong to a same person. In this case, step S410 is performed, and the processor 16 updates the previously tracked face position by using the currently calculated face position.

It should be noted that, in an embodiment, when the processor 16 determines that the shortest distance is greater than the preset distance in step S406, the processor 16, for example, determines that the tracked face has disappeared from the captured image, and accumulates a frame number of the face disappearing from the image. When the accumulated frame number of the face disappearing from the image is greater than a preset frame number (for example, five frames), the processor 16 determines that the tracked face has left, and unregisters the image identification of the tracked face. To be specific, in an embodiment, the processor 16 determines, according to a time period (a frame number) in which the tracked face continuously does not appear in the image, whether to unregister the image identification of the face. Therefore, a decision to perform unregistration is related to the number of frames included per second in a film, and the frame number (a threshold) for determining the disappearance of the face. A smaller threshold indicates higher accuracy of face tracking. In addition, because no recognition is performed during tracking, a larger threshold indicates a higher possibility of being fraudulently used (for example, other person suddenly appear in the position in the image). Therefore, in an embodiment, when the processor 16 prepares to unregister the image identification of the tracked face, the processor 16 further determines whether there is another face (with a distance less than the preset distance) near the face (center point), and also forcefully unregisters the determined face nearby, to avoid a great chance of identification swap occurring when the determining is performed according to only the European distance when the two faces rapidly approach each other and overlap.

For example, the processor 16 may determine, according to the foregoing calculated face position, whether the faces in the image overlap, and when determining that the faces overlap, unregister and re-register both the faces, to avoid a recognition error in the overlapping faces caused by the identification swap.

Figure 6:
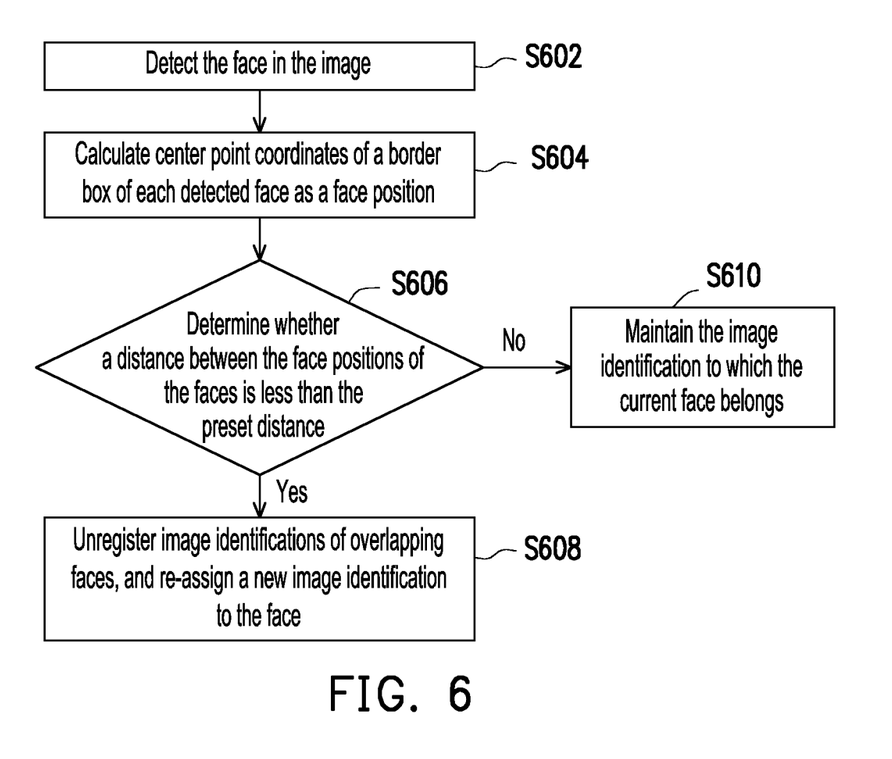
FIG. 6 is a schematic flowchart of an object tracking method according to an embodiment of the invention.

To be specific, FIG. 6 is a schematic flowchart of an object tracking method according to an embodiment of the invention. Referring to FIG. 6, a detailed process of step S204 in FIG. 2 is described in the present embodiment.

In step S602, the processor 16 detects the face in the image. In step S604, the processor 16 calculates center point coordinates of a border box of each detected face as a face position. An implementation of steps S602 to S604 are the same as or similar to steps S402 to S404 in the foregoing embodiment, and therefore, the descriptions thereof are omitted herein.

Different from the foregoing embodiment, in the present embodiment, it is assumed that there is a plurality of detected faces in step S604. In this case, in step S606, the processor 16 calculates a distance between the face positions of the faces in the image, and determines whether the calculated distance is less than the preset distance.

In response to the calculated distance being less than the preset distance, it may be determined that the faces overlap. In this case, step S608 is performed, and the processor 16 unregisters image identifications of the overlapping faces, and assigns a new image identification, to perform subsequent re-recognition. On the contrary, in response to the calculated distance being not less than the preset distance, it indicates that the two face positions do not overlap. In this case, step S610 is performed, and the processor 16 maintains the image identification to which the current face belongs, to save computing resources and avoid a case of identification swap. To be specific, when two or more faces in the image overlap, the processor 16 unregisters image identifications of all the overlapping faces, and because a face appearing in the image again after the unregistration is determined as a new face, a new image identification is assigned. In other words, the number of unregistered faces is equal to the number of assigned new image identifications.

Returning to the process of FIG. 2, in step S206, the processor 16 determines whether the image identification of the currently detected face exists in a plurality of cluster identifications already recognized in a data set of face recognition. In response to the determining being already existent, in step S208, the processor 16 updates the cluster identification of the currently detected face to the cluster identification in the data set. On the contrary, in response to the determining being non-existent, in step S210, the processor 16 acquires a feature value of the face, and compares the feature value of the face with a feature value of a face of each cluster identification, to update the cluster identification to which the currently detected face belongs according to a comparison result.

To be specific, the foregoing data set of face recognition may be really used as a data set of a feature (embedding) and an index, and its format, for example, includes three fields (an image identification ImageId, a cluster identification ClusterId, and a feature Embedding). After a piece of data is received, the processor 16 assigns a temporary index (for example, 100) to the data, and the index may be used as the image identification ImageId. In this case, an index of the object is (100, empty, empty). If the object is a new object, the image identification ImageId does not exist in the data set. Therefore, in an embodiment, the processor 16, for example, presets the cluster identification ClusterId of the currently recognized face to the image identification ImageId (that is, presets it to 100), and uses the cluster identification ClusterId to search in the data set of face recognition to determine whether a same cluster identification exists. In response to the cluster identification ClusterId being already existent, it indicates that faces corresponding to the currently recognized face and the found cluster identification are the same, so that the cluster identification to which the current face belongs may be updated (that is, the cluster identification is determined as the preset image identification). On the contrary, in response to the cluster identification ClusterId being non-existent, it indicates that the currently recognized face is a new object, and in this case, it needs to be further determined whether a feature of the currently recognized face is equal to that of another face in the data set. In response to finding equivalent faces, an index of the object may be modified to (100, empty, feature data). Otherwise, the object may be determined as a new object. In this way, a fault tolerance rate of the face recognition method in the present embodiment may be increased.

To be specific, for a case in which the image identification does not exist in the data set, in the present embodiment, cluster identifications that may belong to a same person in the data set are searched for by comparing feature values, to update the cluster identification to which the currently recognized face belongs.

Figure 7:
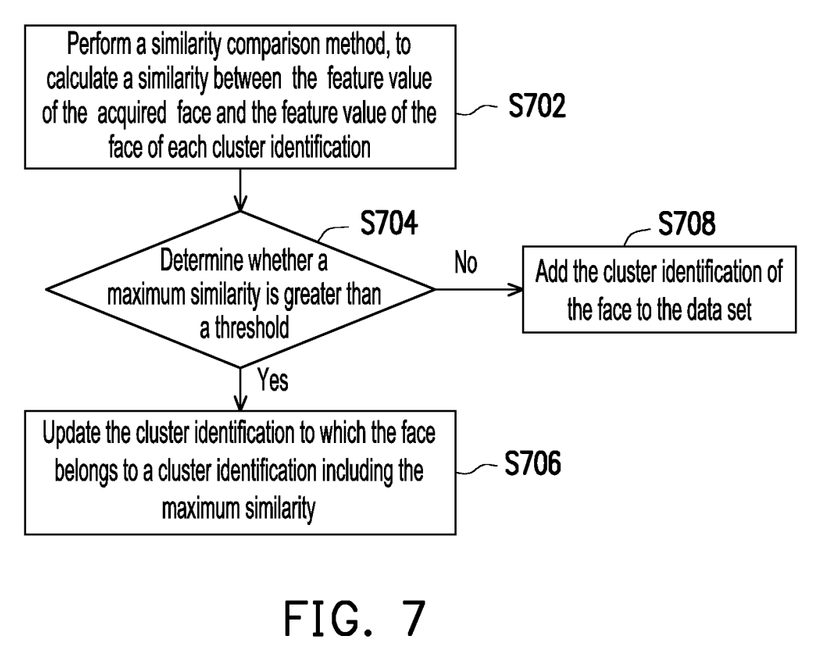
FIG. 7 is a schematic flowchart of a feature value comparison method according to an embodiment of the invention.

To be specific, FIG. 7 is a schematic flowchart of a feature value comparison method according to an embodiment of the invention. Referring to FIG. 7, a detailed process of step S210 in FIG. 2 is described in the present embodiment.

In step S702, the processor 16 performs a similarity comparison method, to calculate a similarity between the feature value of the acquired face and the feature value of the face of each cluster identification. The processor 16, for example, performs a 1-to-N or an N-to-N comparison method on the currently recognized face and the face in the data set, to calculate a distance between every two faces as their similarity, and a maximum similarity thereof is used to determine whether the two faces are the same. It should be noted that, because a large amount of computing resources need to be consumed to perform the similarity comparison method, in an embodiment, the processor 16, for example, performs processing such as resolution downsizing or pre-whitening on the image captured by the image capturing device, so that the number of primitives or data of the image that needs to be processed decreases, so as to improve processing efficiency.

For example, the following table 1 lists a distance matrix obtained after combing any two of images 0 to 4, where images 2 and 4 corresponding to the largest distance 1.1637 are the most similar images, and may be used as a basis for determining whether corresponding faces are the same. The images 0 to 4 are, for example, continuous images captured by the image capturing device 14. This is not limited herein.

TABLE 1

|   | 0 | 1 | 2 | 3 | 4 |
|---|---|---|---|---|---|
| 0 | 0.0000 | 0.8494 | 1.1214 | 0.9232 | 0.6813 |
| 1 | 0.8494 | 0.0000 | 1.1400 | 1.0842 | 0.5679 |
| 2 | 1.1214 | 1.1400 | 0.0000 | 1.0999 | 1.1637 |
| 3 | 0.9232 | 1.0842 | 1.0999 | 0.0000 | 1.1536 |
| 4 | 0.6813 | 0.5679 | 1.1637 | 1.1536 | 0.0000 |

To be specific, in step S704, the processor 16 determines whether a maximum similarity in the calculated similarities is greater than a threshold. In response to the maximum similarity being greater than the threshold, it may be determined that the two faces are the same. Therefore, in step S706, the processor 16 updates the cluster identification to which the currently recognized face belongs to a cluster identification including the maximum similarity. On the contrary, in response to the maximum similarity being not greater than the threshold, it may be determined that the two faces are different. Therefore, in step S708, the processor 16 adds the cluster identification to which the currently recognized face belongs to the data set, as a new face. In an embodiment, a value of the threshold may be adjusted to determine a threshold for face recognition (that is, a degree of difficulty). A larger value of the threshold indicates a higher face similarity requirement, so that a more accurate recognition result can be obtained.

It should be noted that, when the 360-degree panoramic camera is used to capture an image, due to high resolution (for example, 4K resolution) of the captured image, a longer time is required for transmitting and processing (feature value comparison) data of the image. In addition, when the microphone array is used to detect a sound source and recognize voice, a processing delay is also caused due to problems such as angle convergence and voice recognition difficulties. Therefore, in an embodiment, the processor 16, for example, compares a time point at which the image is processed with a time point at which voice recognition is completed, to determine whether someone is speaking, and determine whether to carry out a follow-up action (that is, to update the cluster identification to which the recognized face belongs). If a difference between the time point at which the image is processed and the time point at which voice recognition is completed is too great, it may be determined that there is no correspondence between the image obtained at the time point and the sound source. Consequently, the comparison between the image and the voice is not worthy of reference. In this case, the processor 16 abandons a follow-up action, to save computing resources.

Figure 8:
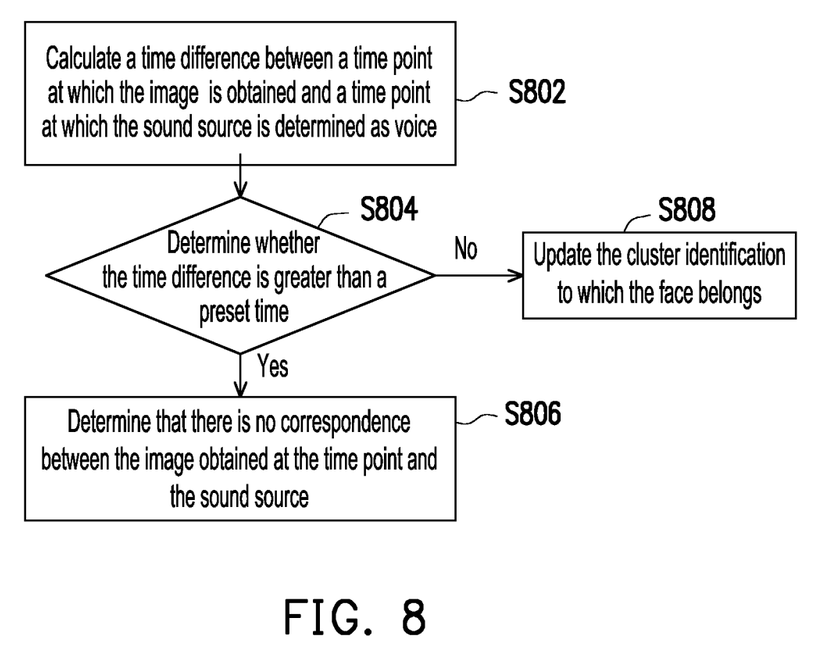
FIG. 8 is a schematic flowchart of a face recognition method according to an embodiment of the invention.

To be specific, FIG. 8 is a schematic flowchart of a face recognition method according to an embodiment of the invention. Referring to FIG. 8, a detailed process of updating a cluster identification to which the face belongs according to a comparison result in step S210 in FIG. 2 is described in the present embodiment.

In step S802, the processor 16 calculates a time difference between a time point at which the image is obtained and a time point at which the sound source is determined as voice, and in step S804, determines whether the calculated time difference is greater than a preset time. A length of the preset time is, for example, any value between 1 second to 2 seconds. This is not limited herein.

In response to the calculated time difference being greater than the preset time, it indicates that the recognized voice and the compared feature value of the face may not belong to a same person. Therefore, in step S806, the processor 16 determines that there is no correspondence between the image obtained at the time point and the sound source. In response to the calculated time difference being not greater than the preset time, it indicates that the recognized voice and the compared feature value of the face belong to a same person. Therefore, it may be determined that the comparison result is valid, and the processor 16 updates the cluster identification to which the face belongs.

Based on the foregoing, according to the face recognition method and apparatus of the invention, an image of a person that is speaking can be accurately captured by using a detection result in combination with the sound receiving device and the image capturing device in a case of a single machine without a network, and overlapping faces and a face having left the image are/is unregistered/re-registered or processed in other manners, so that problems of identification swap caused by overlapping faces and re-entering after leaving can be resolved, thereby increasing a fault tolerance rate of face recognition. An image captured/cropped according to face recognition can be transmitted to a user at another end through communication software such as a video conference, thereby achieving remote sharing of a video image.

What is claimed is:

1. A face recognition method, adapted to an electronic device having a sound receiving device and an image capturing device, wherein the method comprises the following steps:
    detecting a direction of a sound source by using the sound receiving device to capture an image in the direction by using the image capturing device;
    detecting and tracking a face in the image to assign an image identification to the face according to a tracking result;
    determining whether the image identification exists in a plurality of cluster identifications already recognized in a data set of face recognition; and
    in response to the image identification not existing in the data set, capturing a feature value of the face, and comparing the feature value of the face with a feature value of a face in each of the cluster identifications to update a cluster identification to which the face belongs according to a comparison result, wherein the image capturing device is a panoramic camera, and the step of capturing the image in the direction by using the image capturing device comprises:
    capturing a panoramic image around the electronic device by using the image capturing device, and cropping a partial image in the direction in the panoramic image as an image on which face recognition is performed.

2. The face recognition method according to claim 1, wherein the step of detecting and tracking the face in the image comprises:
    when it is detected that the image comprises a plurality of faces, tracking the faces by using an object tracking algorithm, and determining whether the faces overlap; and
    in response to the overlapping faces, unregistering the image identification of the overlapping faces, and reassigning a new image identification to the face.

3. The face recognition method according to claim 2, wherein the step of tracking the faces by using the object tracking algorithm and determining whether the faces overlap comprises:
    calculating center point coordinates of a border box of each of the detected faces as a face position, and determining whether a distance between the face positions of the faces is less than a preset distance; and
    in response to the distance being less than the preset distance, determining that the faces overlap.

4. The face recognition method according to claim 1, wherein the step of detecting and tracking the face in the image to assign the image identification to the face according to the tracking result comprises:
    calculating center point coordinates of a border box of each of the detected faces as a face position, and determining whether a shortest distance between the face position and a plurality of previously tracked face positions is greater than a preset distance; and
    in response to the shortest distance being greater than the preset distance, determining that the face is not equal to a previously tracked face, assigning a new image identification to the face, and unregistering an image identification of the previously tracked face.

5. The face recognition method according to claim 1, wherein the step of detecting and tracking the face in the image to assign the image identification to the face according to the tracking result further comprises:
    determining whether a frame number of the tracked face disappearing from the captured image exceeds a preset frame number; and
    in response to the frame number being greater than the preset frame number, determining that the tracked face has left, and unregistering the image identification of the tracked face.

6. The face recognition method according to claim 1, wherein before the step of detecting the direction of the sound source by using the sound receiving device, the method further comprises:
    recognizing a face in the panoramic image; and
    adjusting a detection angle of the sound receiving device to pointing to a direction of the recognized face.

7. The face recognition method according to claim 1, wherein the step of acquiring the feature value of the face and comparing the feature value of the face with the feature value of the face of each of the cluster identifications to update the cluster identification to which the face belongs according to the comparison result comprises:
    performing a similarity comparison method to calculate a similarity between the feature value of the acquired face and the feature value of the face of each of the cluster identifications;
    determining whether a maximum similarity in the calculated similarities is greater than a threshold;
    in response to the maximum similarity being not greater than the threshold, adding the cluster identification to which the face belongs to the data set; and
    in response to the maximum similarity being greater than the threshold, updating the cluster identification to which the face belongs to a cluster identification having the maximum similarity.

8. The face recognition method according to claim 1, wherein the step of detecting the direction of the sound source by using the sound receiving device to capture the image in the direction by using the image capturing device further comprises:
    detecting at least one feature of the sound source by using the sound receiving device to determine whether the sound source is voice, and when the sound source is determined as voice, capturing the image in the direction by using the image capturing device, wherein the at least one feature comprises a sounding time interval, a continuous sounding length, and convergence of sounding data.

9. The face recognition method according to claim 1, wherein the step of detecting the direction of the sound source by using the sound receiving device to capture the image in the direction by using the image capturing device further comprises:
calculating a time difference between a time point at which the image is obtained and a time point at which the sound source is determined as voice, and determining whether the calculated time difference is greater than a preset time; and
in response to the time difference being greater than the preset time, determining that there is no correspondence between the image obtained at the time point and the sound source at the time point.

10. A face recognition apparatus, comprising:
a sound receiving device, configured to detect a sound source;
an image capturing device, configured to capture an image;
a processor, coupled to the sound receiving device and the image capturing device, and configured to:
detect a direction of a sound source by using the sound receiving device to capture an image in the direction by using the image capturing device;
detect and track a face in the image to assign an image identification to the face according to a tracking result;
determine whether the image identification exists in a plurality of cluster identifications already recognized in a data set of face recognition; and
in response to the image identification not existing in the data set, acquire a feature value of the face, and compare the feature value of the face with a feature value of a face of each of the cluster identifications to update a cluster identification to which the face belongs according to a comparison result, wherein the image capturing device is a panoramic camera, and the processor is configured to:
capture a panoramic image around the electronic device by using the image capturing device, and crop a partial image in the direction in the panoramic image as an image on which the face recognition is performed.

11. The face recognition apparatus according to claim 10, wherein when it is detected that the image comprises a plurality of faces, the processor is configured to: track the faces by using an object tracking algorithm, and determine whether the faces overlap; and in response to the overlapping faces, unregister the image identification of the overlapping faces, and reassign a new image identification to the face.

12. The face recognition apparatus according to claim 11, wherein the processor is configured to: calculate center point coordinates of a border box of each of the detected faces as a face position, and determine whether a distance between the face positions of the faces is less than a preset distance; and in response to the distance being less than the preset distance, determine that the faces overlap.

13. The face recognition apparatus according to claim 10, wherein the processor is configured to: calculate center point coordinates of a border box of each of the detected faces as a face position, and determine whether a shortest distance between the face position and a plurality of previously tracked face positions is greater than a preset distance; and in response to the shortest distance being greater than the preset distance, determine that the face is not equal to a previously tracked face, assign a new image identification to the face, and unregister an image identification of the previously tracked face.

14. The face recognition apparatus according to claim 10, wherein the processor is further configured to: determine whether a frame number of the tracked face disappearing from the captured image exceeds a preset frame number; and in response to the frame number being greater than the preset frame number, determine that the tracked face has left, and unregister the image identification of the tracked face.

15. The face recognition apparatus according to claim 10, wherein the processor is configured to: recognize a face in the panoramic image, and adjust a detection angle of the sound receiving device to pointing to a direction of the recognized face.

16. The face recognition apparatus according to claim 10, wherein the processor is configured to: perform a similarity comparison method to calculate a similarity between the feature value of the acquired face and the feature value of the face of each of the cluster identifications; determine whether a maximum similarity in the calculated similarities is greater than a threshold; in response to the maximum similarity being not greater than the threshold, add the cluster identification to which the face belongs to the data set; and in response to the maximum similarity being greater than the threshold, update the cluster identification to which the face belongs to a cluster identification having the maximum similarity.

17. The face recognition apparatus according to claim 10, wherein the processor is further configured to: detect at least one feature of the sound source by using the sound receiving device to determine whether the sound source is voice, and when the sound source is determined as voice, capture the image in the direction by using the image capturing device, wherein the at least one feature comprises a sounding time interval, a continuous sounding length, and convergence of sounding data.

18. The face recognition apparatus according to claim 10, wherein the processor is configured to: calculate a time difference between a time point at which the image is obtained and a time point at which the sound source is determined as voice, and determine whether the calculated time difference is greater than a preset time; and in response to the time difference being greater than the preset time, determine that there is no correspondence between the image obtained at the time point and the sound source at the time point.

* * * * *